(12) United States Patent
Mitchell et al.

(10) Patent No.: US 8,302,780 B1
(45) Date of Patent: Nov. 6, 2012

(54) INDUSTRIAL SEPARATOR AND DEWATERING PLANT

(75) Inventors: John Christopher Mitchell, Santa Margarita, CA (US); Ken M. Stedman, Lake Forest, CA (US); Glenn Edwin Walser, Duncanville, TX (US)

(73) Assignee: M2 Renewables, Inc., Lake Forest, CA (US)

( * ) Notice: Subject to any disclaimer, the term of this patent is extended or adjusted under 35 U.S.C. 154(b) by 0 days.

(21) Appl. No.: 13/402,531

(22) Filed: Feb. 22, 2012

(51) Int. Cl.
*B01D 33/04* (2006.01)
*B01D 33/46* (2006.01)
*B01D 33/50* (2006.01)
*B01D 33/76* (2006.01)

(52) U.S. Cl. ........ 210/391; 210/396; 210/398; 210/400; 210/409; 210/783; 210/791

(58) Field of Classification Search ................ None
See application file for complete search history.

(56) References Cited

U.S. PATENT DOCUMENTS

| | | | | |
|---|---|---|---|---|
| 955,843 A * | 4/1910 | Bossert | ............ | 210/355 |
| 1,334,458 A * | 3/1920 | Johnson | ............ | 198/822 |
| 1,920,158 A * | 7/1933 | Albertson | ............ | 210/159 |
| 2,861,688 A * | 11/1958 | Harms | ............ | 210/744 |
| 2,919,806 A * | 1/1960 | Hock et al. | ............ | 210/414 |
| 3,119,373 A * | 1/1964 | Schmid | ............ | 119/451 |
| 3,420,658 A * | 1/1969 | Berhenke et al. | ............ | 75/409 |
| 3,706,378 A | 12/1972 | Markwick | | |
| 3,721,214 A * | 3/1973 | Staples et al. | ............ | 119/442 |
| 4,012,185 A * | 3/1977 | Poore et al. | ............ | 425/120 |
| 4,200,530 A * | 4/1980 | Mechalas | ............ | 210/784 |
| 4,204,855 A * | 5/1980 | Monteyne | ............ | 65/141 |
| 4,243,527 A * | 1/1981 | Leonard | ............ | 210/785 |
| 4,272,363 A * | 6/1981 | Cargile, Jr. | ............ | 209/10 |
| 4,289,519 A * | 9/1981 | Monteyne | ............ | 65/19 |
| 4,454,030 A * | 6/1984 | Young | ............ | 209/669 |
| 4,456,536 A * | 6/1984 | Lorenz et al. | ............ | 210/776 |
| 4,592,275 A * | 6/1986 | Frankl | ............ | 99/495 |
| 4,658,708 A * | 4/1987 | Rastoin | ............ | 99/323.9 |
| 4,731,180 A * | 3/1988 | Huff | ............ | 210/298 |
| 4,834,878 A * | 5/1989 | Anderson | ............ | 210/202 |
| 4,921,608 A | 5/1990 | Lee | | |
| 4,948,299 A * | 8/1990 | Cronk et al. | ............ | 405/179 |
| 5,156,749 A * | 10/1992 | Williams | ............ | 210/770 |
| 5,207,907 A * | 5/1993 | DeLons et al. | ............ | 210/396 |
| 5,268,100 A * | 12/1993 | Hartzell | ............ | 210/396 |
| 5,341,826 A | 8/1994 | Huber | | |
| 5,569,382 A | 10/1996 | Reynders | | |
| 5,624,579 A * | 4/1997 | Bratten | ............ | 210/783 |
| 5,628,912 A * | 5/1997 | Nesseth | ............ | 210/768 |
| 5,738,782 A * | 4/1998 | Schafer et al. | ............ | 210/171 |
| 5,779,887 A * | 7/1998 | Rector et al. | ............ | 210/159 |
| 5,832,873 A * | 11/1998 | Tu | ............ | 119/479 |
| 5,853,585 A * | 12/1998 | Nesseth | ............ | 210/394 |

(Continued)

*Primary Examiner* — Robert James Popovics
(74) *Attorney, Agent, or Firm* — Patent Law & Venture Group; Gene Scott (57) ABSTRACT

An industrial separator and dewatering plant has a filtering portion using an inclined conveyor belt for carrying away a watery cake from an aqueous mixture containing solid matter. The filtering portion further has a wash water spray nozzle directed at the conveyor belt so as to dislodge the watery cake penetrated within the conveyor belt. A dewatering portion has a compression auger screw positioned for receiving the dislodged watery cake and the wash water. An auger screw receives the wash water and cake which is transported to a compression cage where compression drives water out of the cake leaving a semi-solid cake which is pressed against a door where it exits the plant.

5 Claims, 8 Drawing Sheets

U.S. PATENT DOCUMENTS

| | | | |
|---|---|---|---|
| 5,897,700 A * | 4/1999 | Manning | 106/697 |
| 5,961,847 A * | 10/1999 | Creps et al. | 210/783 |
| 5,968,353 A * | 10/1999 | Herbert et al. | 210/221.2 |
| 6,026,765 A * | 2/2000 | Tu | 119/479 |
| 6,079,427 A * | 6/2000 | Perry, Jr. | 134/104.4 |
| 6,189,703 B1 | 2/2001 | Dooley, Jr. | |
| 6,227,379 B1 * | 5/2001 | Nesseth | 210/393 |
| 6,270,669 B1 * | 8/2001 | Bauer | 210/237 |
| 6,395,187 B1 * | 5/2002 | Alanis | 210/758 |
| 6,451,213 B2 * | 9/2002 | Huebner | 210/770 |
| 6,461,523 B1 * | 10/2002 | Greenrose | 210/770 |
| 6,494,167 B1 * | 12/2002 | Chen | 119/479 |
| 6,495,031 B1 * | 12/2002 | Bratten | 210/97 |
| 6,572,763 B2 * | 6/2003 | Gorshing | 210/159 |
| 6,651,822 B2 * | 11/2003 | Alanis | 210/394 |
| 6,685,830 B2 * | 2/2004 | Hartleitner et al. | 210/262 |
| 6,733,663 B1 * | 5/2004 | Simon et al. | 210/104 |
| 6,846,421 B2 * | 1/2005 | Bratten | 210/741 |
| 6,899,807 B2 * | 5/2005 | Cummings | 210/97 |
| 6,942,786 B1 | 9/2005 | Fosseng | |
| 7,105,088 B2 * | 9/2006 | Schien et al. | 210/188 |
| 7,335,311 B2 * | 2/2008 | Christophersson | 210/739 |
| 7,347,933 B2 * | 3/2008 | Berry et al. | 210/158 |
| 7,462,279 B2 * | 12/2008 | Dixon et al. | 210/170.09 |
| 7,824,547 B2 * | 11/2010 | Reynders et al. | 210/171 |
| 7,913,854 B2 * | 3/2011 | Bratten et al. | 210/400 |
| 7,964,105 B2 * | 6/2011 | Moss | 210/770 |
| 8,017,021 B1 * | 9/2011 | Staples | 210/773 |
| 8,092,691 B2 * | 1/2012 | Youngs et al. | 210/783 |
| 8,147,689 B1 * | 4/2012 | Cogar | 210/173 |
| 2001/0054591 A1 * | 12/2001 | Gorshing | 210/769 |
| 2003/0127375 A1 * | 7/2003 | Gribble et al. | 210/101 |
| 2003/0230520 A1 * | 12/2003 | Cummings | 210/85 |
| 2005/0126967 A1 * | 6/2005 | Berry et al. | 210/158 |
| 2006/0144798 A1 * | 7/2006 | Dixon et al. | 210/724 |
| 2006/0186056 A1 * | 8/2006 | Ivan | 210/704 |
| 2006/0273047 A1 * | 12/2006 | Newkirk et al. | 210/780 |
| 2007/0051672 A1 * | 3/2007 | Reynders et al. | 210/167.09 |
| 2007/0199906 A1 * | 8/2007 | McCauley et al. | 210/772 |
| 2007/0210013 A1 * | 9/2007 | Bratten et al. | 210/783 |
| 2010/0147779 A1 * | 6/2010 | Miller | 210/768 |
| 2010/0224574 A1 * | 9/2010 | Youngs et al. | 210/783 |
| 2011/0005985 A1 * | 1/2011 | Dietenhauser et al. | 210/171 |
| 2011/0089122 A1 * | 4/2011 | Smith | 210/774 |
| 2011/0100930 A1 * | 5/2011 | DeWaard | 210/787 |
| 2012/0103893 A1 * | 5/2012 | Youngs et al. | 210/359 |
| 2012/0125827 A1 * | 5/2012 | Fogel et al. | 210/138 |
| 2012/0152861 A1 * | 6/2012 | Vanier et al. | 210/774 |

\* cited by examiner

INDUSTRIAL SEPARATOR AND DEWATERING PLANT

No federally sponsored research or development was used in the presented apparatus and method of use, and no reference to a sequence listing or table, a computer program listing or compact disc appendix is included herein.

BACKGROUND OF THE DISCLOSURE

This disclosure relates to the field of industrial filtering systems and more particularly to such a system that uses a continuous filter belt. Filter belts are often used to filter solid material from an aqueous mixture. Belts commonly become clogged with the filtered material so that they require occasional or continuous cleaning. Keeping the belt clean is critical to efficient operation and especially for continuous operation. The use of belt filters is well known in the art which teaches a variety of ways for ridding the filters of solid material. Once the filtered material has been removed from the filter belt it is known, for instance, to mechanically extract fluid via a screw press. Hot water and steam are known to be used to heat and clean filter belts. It is known to use wash nozzles to clean raked-off or screened raw sewage. The prior art teaches spraying through a continuous drag-out belt to dislodge debris. It is also known to use compressed air as the primary motive force to clean a moving filter belt. However, the prior art does not provide a solution to preventing wastewater from collecting in the bottom of a processing plant. The prior art does not provide a solution to segregating filtered water from spray-off water. Finally, the prior art also does not provide a solution to possible overflow of water within an auger screw. The present apparatus provides a solution to these difficulties.

BRIEF SUMMARY OF THE DISCLOSURE

The presently described apparatus processes wastewater to extract most of the water content leaving a semi-dry organic cake which has value in post processes. The process receives the wastewater, referred to as "dirty water" and first filters it to remove most of the liquid content and then compresses the remaining cake to extract most of the remaining water. The filtration step uses a fine mesh continuous conveyor belt filter cloth to capture solids and then an auger drive to press most of the remaining water out of the cake. A wash spray is directed on the back of the filter which not only washes away debris that is attached on the outside of the filter cloth, but also clears debris normally clogged within pores of the filter cloth. In the auguring step, the cake and debris is compressed, which squeezes out the remaining dirty water and the wash water. A free water drain is located at one end of an auger channel while the cake/debris are compressed and moved by the auger screw within the auger channel in the opposite direction.

The debris captured by the filter cloth is driven downwardly into an open collection chamber which delivers the debris into the auger screw which conveys the debris to a compression chamber. Wash water that is not absorbed in the debris is free to flow above and around the auger's flights and by gravity flows toward and into the free water drain. The free water drain is located in an enclosed obstructed location so that only overflow liquid is able to freely flow into the drain. By allowing this drainage, a liquid level in the collection chamber is controlled and the dewatering drain located under the dewatering section is able to drain the remainder of water absorbed in the solid debris so that the solids debris that exits the device can meet a specified moisture content.

An objective of the described apparatus and method is to prevent contamination of a lower portion of a conveyor filter belt by drainage from an upper portion.

A further objective is to reduce input energy requirements by eliminating the need for an air blower and air knife common to prior art methods.

A further objective is to provide sufficient time for gravity drainage through a filter belt of dirty water entering the plant.

A further objective is to provide efficient filter cleaning using relatively little water in a back-spray step.

Other features and advantages will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING

Illustrated in the accompanying drawing is a best mode embodiment of the presently presented apparatus and method of use. In such drawing.

Like reference symbols in the various figures indicate like elements.

DETAILED DESCRIPTION OF THE INVENTION

Figure 1:
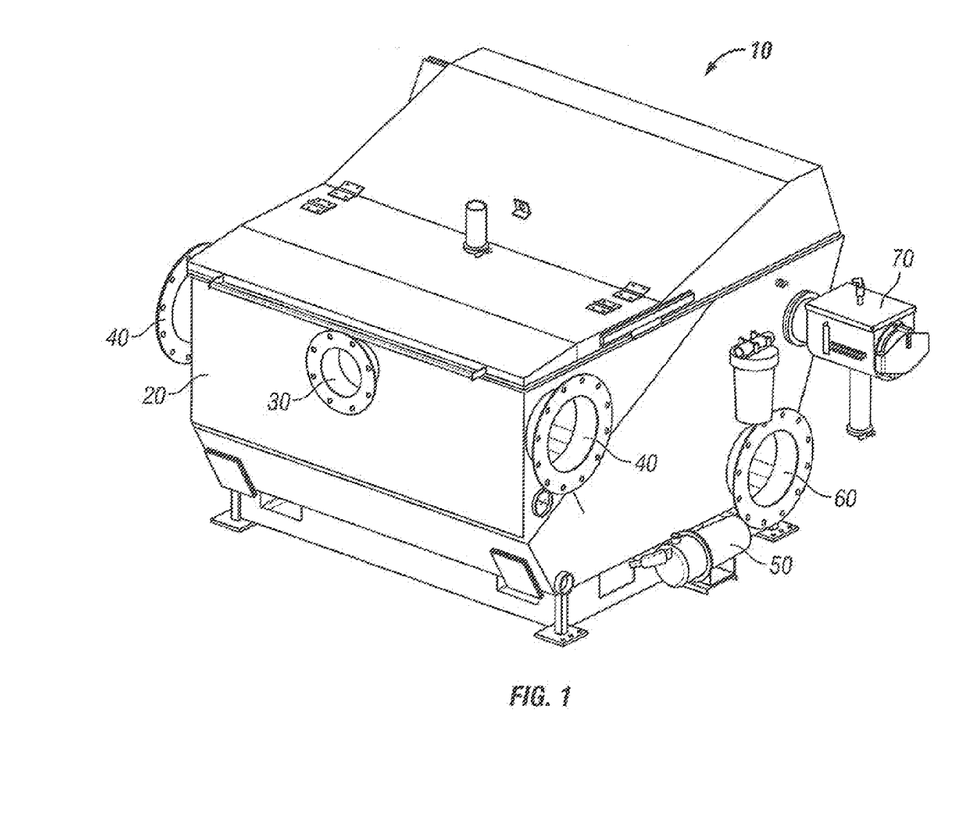
FIG. 1 is an example mechanical schematic of said apparatus as viewed in a frontal perspective thereof.
Figure 7:
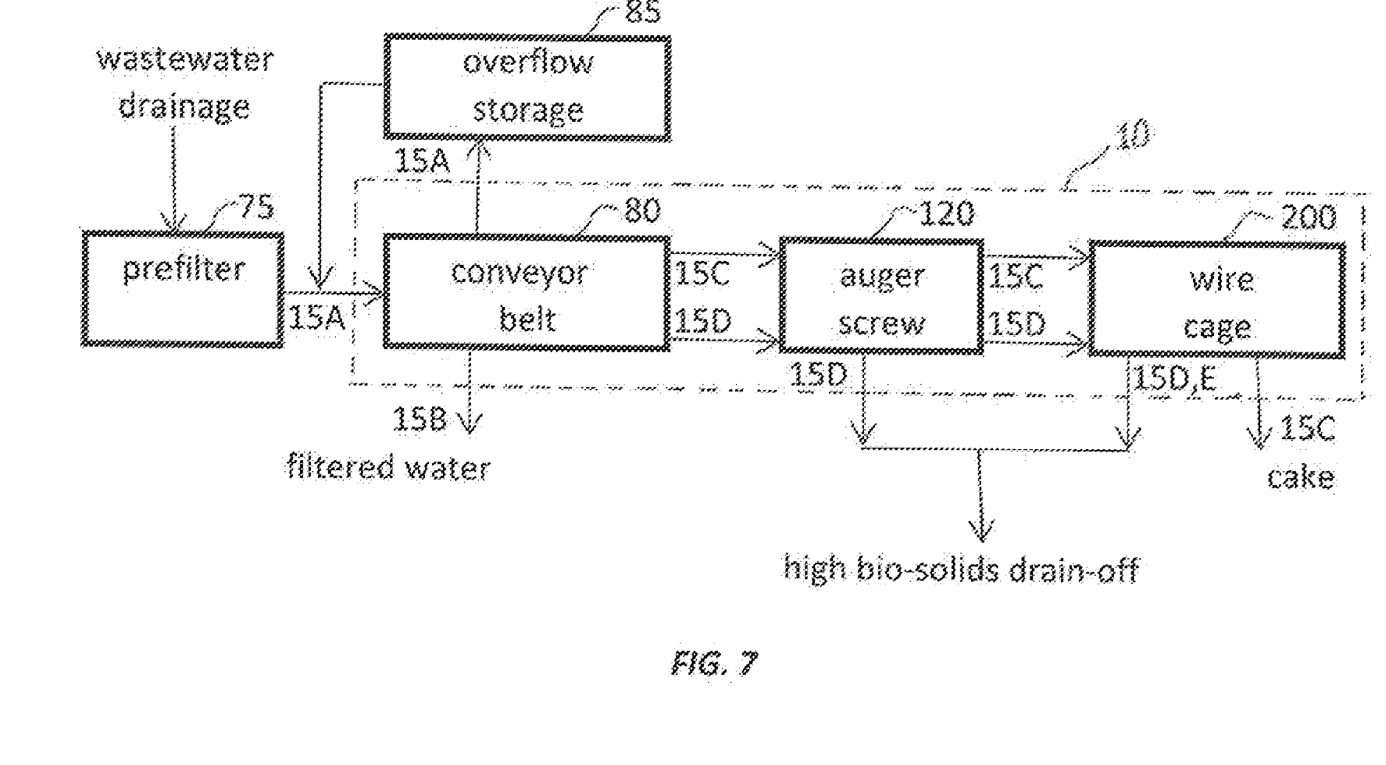
FIG. 7 is an example block diagram illustrating a method of operation of the apparatus for producing a semisolid product.

FIG. 1 illustrates an industrial separator and dewatering plant 10 used for processing wastewater 15A; see FIG. 7. Components of plant 10 are supported within and attached externally to a structural enclosure 20. Locations of a plant inlet 30 for receiving the wastewater 15A, wastewater overflow outlets 40, a wash water pump 50, an outlet 60 for filtered water 15B, and a dewatering device 70 are shown. Techniques for joining in-feed and out-feed conduits to elements 30, 40 and 60 are well known in the art.

Figure 2A:
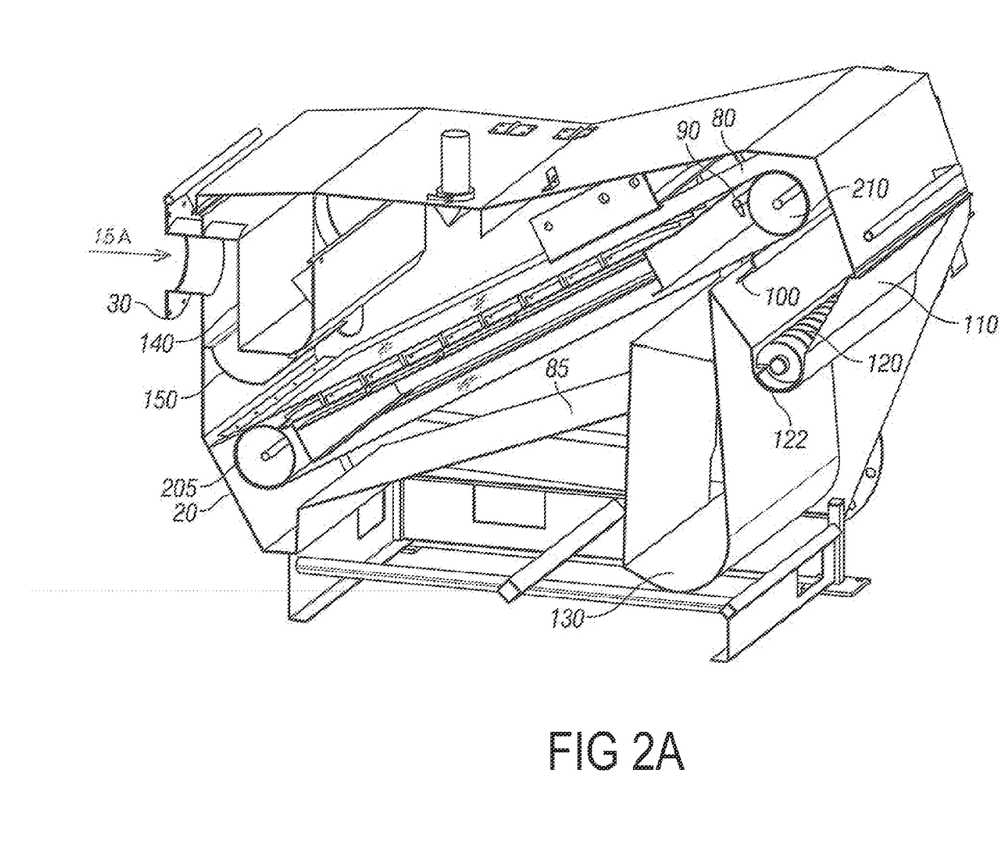
FIG. 2A is an example mechanical schematic thereof shown in a side perspective view with portions deleted so as to better illustrate interior features.

FIG. 2A shows locations of a conveyor belt 80 supported by a bottom 205 and a top 210 rollers, belt 80 being a fine mesh filter which has an upper belt portion 82 moving above a lower belt portion 84, a conveyor cavity 85 within which conveyor belt 80 operates, spray wash nozzle(s) 90, a belt scraper 100, a cake collection basin 110, an auger 120, collection manifold 130, a diverter panel 140, and a catch shelf 150. Wastewater inlet 30 is shown at the left in FIG. 2A.

Figure 2B:
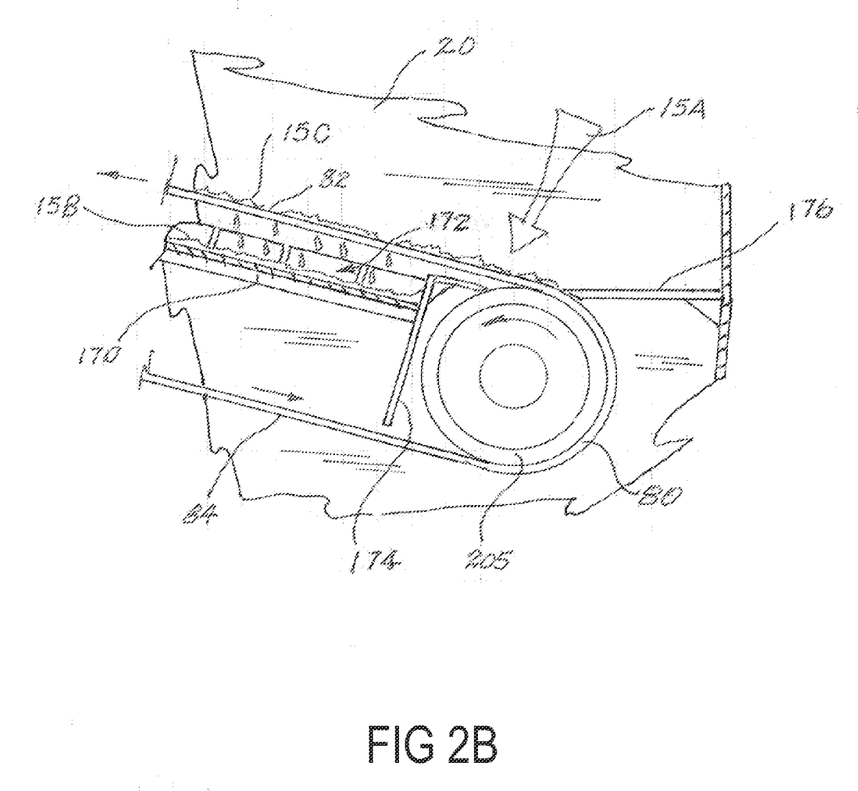
FIG. 2B is an example partial sectional view of a lower portion of a conveyor belt thereof and illustrating a dewatering and filtering process.

FIG. 2B shows conveyor belt 80 as it moves around lower pulley 205 and carries wastewater 15A on upper belt portion 82 upwardly to the left with filtered water 15B shown dripping through upper belt portion 82 onto diverter pan 170 and flowing through window 172. A lower dam plate 174 prevents filtered water 15B from reaching lower pulley 205 and lower belt portion 84. An upper dam plate 176 is positioned to prevent incoming wastewater 15A, illustrated by a large arrow, from flowing past conveyor belt 80. Cake 15C remains on and within upper belt portion 82 and is carried upwardly.

Figure 3:
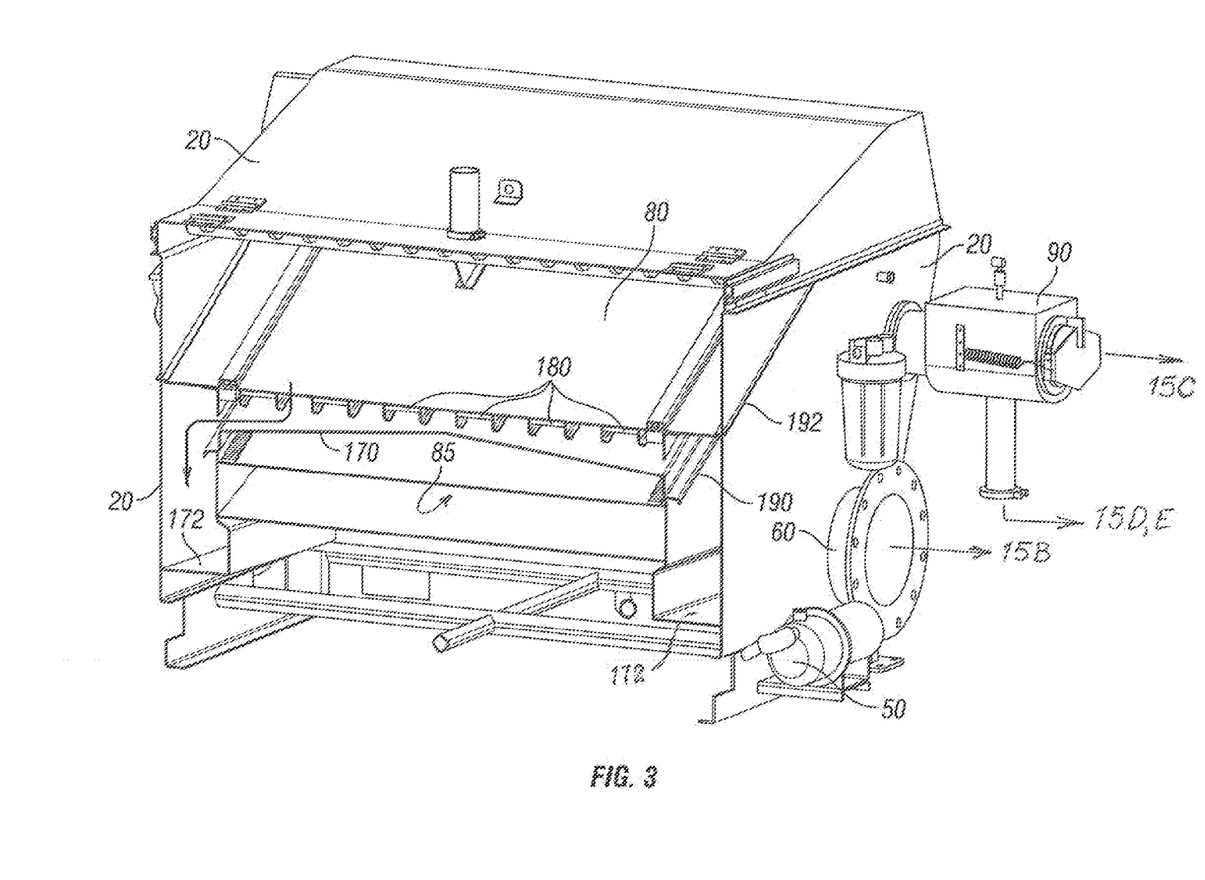
FIG. 3 is an example mechanical schematic thereof shown in a frontal perspective view with portions deleted so as to better illustrate interior features.

FIG. 3 shows locations of the diverter pan 170 which, for clarity, is not shown in FIG. 2A, framework ribs 180 which support upper belt portion 82, and rubber gasket seals 190 and 192 which constrains filtered water 15B so it can be captured without being contaminated by cake 15A after dribbling onto pan 170. Portions of the enclosure 20, the conveyor belt 80, the conveyor cavity 85, and also the wash water pump 50 and the filtered water outlet 60 are also shown in FIG. 3.

Figure 4:
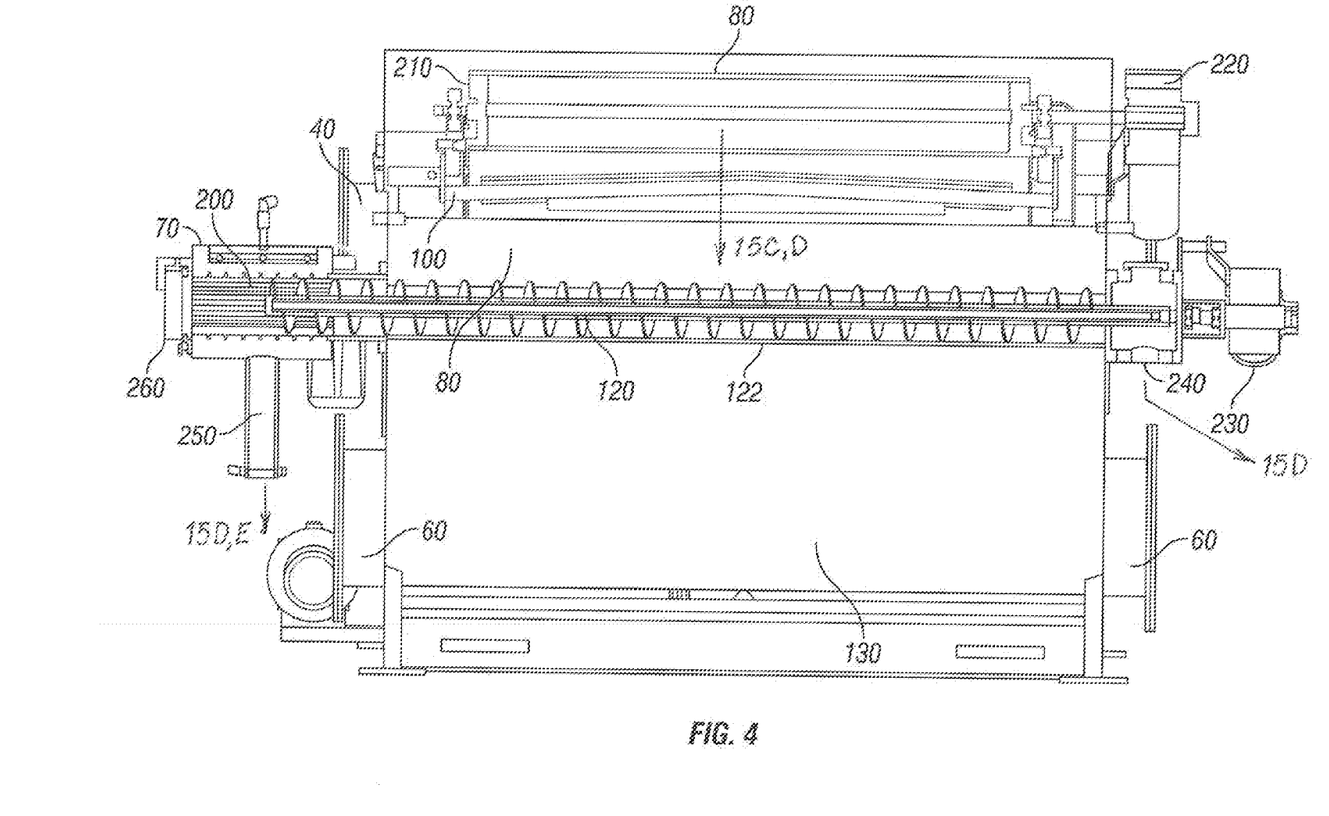
FIG. 4 is an example mechanical schematic thereof shown in a rear elevational view with portions deleted so as to better illustrate interior features.

FIG. 4 shows locations of a cylindrical wire cage 200, the top roller 210 which is shown in cross-section, a belt drive 220 of the conveyor belt 80, an auger drive 230, an auger overflow drain 240 for releasing wash water 15D, a dewatering drain 250 for receiving wash water 15D and extracted water 15E, and a compression door 260. FIG. 4 also shows: the wastewater overflow outlet 40, filtered water collection basin 130, filtered water outlets 60, and belt scraper 100.

Figure 5:
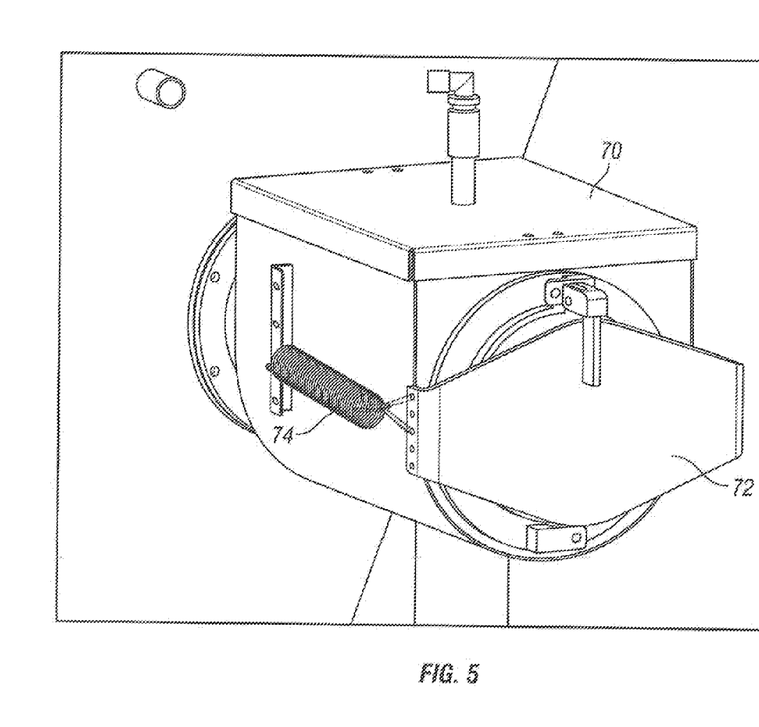
FIG. 5 is an example mechanical schematic of a dewatering device thereof shown in an exterior perspective.
Figure 6:
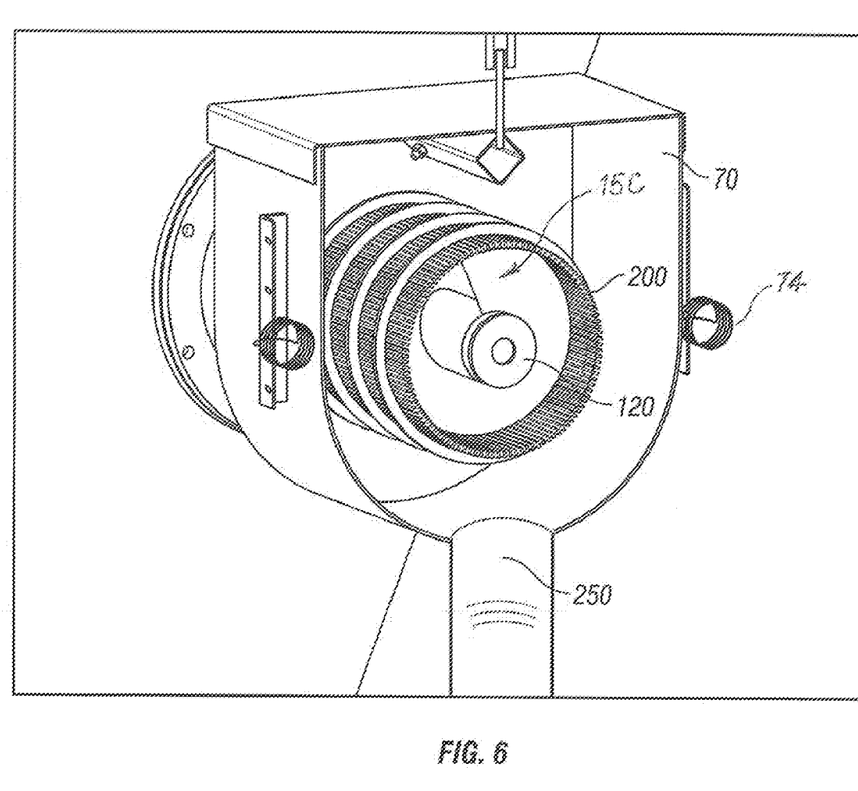
FIG. 6 is an example mechanical schematic perspective view of FIG. 5 with portions removed to better illustrate interior features.

FIG. 5 shows the dewatering device 70 with its spring loaded door 72 and one of its engaging springs 74. FIG. 6 shows interior details of the dewatering device 70 including the wire cage 200, auger 120, and dewatering drain 250.

Plant 10 separates and dewaters wastewater 15A entering plant 10 at inlet 30. Wastewater 15A may have a total suspended solids (TSS) in the range of from about 100 to 2,000 mg/L. This waste water 15A may be collected from a typical municipal sewage system which might have about 300 mg/L TSS. As shown in FIG. 7, trash, garbage and other materials usually found in wastewater drainage may be separated using a pre-filter 75. Downstream of pre-filter 75 wastewater 15A enters plant 10 at inlet 30 where it encounters diverter panel 140 dropping onto catch shelf 150 whereupon it spills onto conveyor belt 80 as shown in FIG. 2B. The diverter panel 140 and catch shelf 150 shown in FIG. 2 direct the incoming wastewater 15A to conveyor belt 80 while absorbing most of its incoming kinetic energy. When the inflow of wastewater 15A is in excess of what belt 80 is able to accommodate, it flows out of wastewater overflow outlets 40 shown in FIG. 1 and into an overflow storage tank 85 shown in FIG. 7 and may be returned to plant 10 later through inlet 30. The conveyor belt 80 is made of a filter mesh material of a fineness selected for capturing a desired degree of the TSS carried by wastewater 15A. Once on conveyor belt 80 wastewater 15A drains by gravity through the top portion 82 of belt 80 and, as shown in FIG. 2, falls onto diverter pan 170 and from there into alleys 172 and collection manifold 130 to then leave plant 10 via outlets 60 as filtered water 15B. Gravity drainage continues during the entire time wastewater 15A rides on belt 80, that is, as belt 80 moves upward.

A cake 15C left behind on and in conveyor belt 80 comprises between 40-90% of the TSS of the wastewater 15A depending on the type and fineness of the filter material of which belt 80 is made. Conveyor belt 80 moves continuously as an inclined rotating linear conveyor. Both upper 82 and lower 84 portions of belt 80 may be planar and may move in parallel with each other in opposite directions and over spaced apart top roller 210 and bottom roller 205 (FIGS. 2A and 2B).

As belt 80 moves over top roller 210 some portion of cake 15C may fall into cake collection basin 110 and therefore into auger screw 120 as best illustrated in FIG. 2. As belt 80 starts to move downward wash water 15D, a high pressure low volume spray is delivered from one or more nozzles 90 against the inside of the lower belt portion 84 of belt 80 where further cake 15C is washed into cake collection basin 110. Subsequently residue of cake 15C is dislodged by scraper 100 and falls into cake collection basin 110 as well. Cake 15C and the wash water 15D is collected in auger screw 120 and conveyed thereby to the wire cage 200 as best shown in FIG. 4, and as described below. Scraper 100 is in position to deflect overspray of wash water 15D into collection basin 110 which may prevent the overspray from entering conveyor cavity 85.

Cake 15C and wash water 15D are carried by auger screw 120 to the left in FIG. 4 into wire cage 200 as described above, where wash water 15D drains into dewatering drain 250. Cake 15C is compacted by auger screw 120 where most of its water content 15E is extracted. Brushes 123 attached to, and extending outwardly from the flights of auger screw 120 keep the approximately 1 mm gaps between adjacent wires of the wire cage 200 clear so that extracted water 15E may flow freely out of wire cage 200 and into dewatering drain 250.

Overflow drain 240, located at the right end of auger screw 120 in FIG. 4 removes excess wash water 15D within auger screw 120 when the level of such water rises high enough to flow around auger flights of auger screw 120 which keeps the screw 120 from flooding.

With the water extraction step described above, cake 15C is converted to a semi-solid consistency which passes out of plant 10 though door 72 when pressure within the wire cage 200 is sufficient to push open door 72 against tension springs 74. The semi-solid cake 15C may have a water content of between only 50% and 60%.

The auger screw 120 is mechanically rotated within auger trough 122 by an electric auger drive motor 230, as shown in FIG. 4. A further drive 220 of belt 80 is also shown in FIG. 4. As shown, auger trough 122 is open above auger screw 120 so that cake 15C and wash water 15D may freely fall into it from belt 80. Wash water 15D and extracted water 15E may be jointly collected into a common manifold outside of plant 10 and may have between 1500 and 5000 mg/L TSS. There are commercial uses for this water because of its high concentration of biological matter.

Embodiments of the subject apparatus and method have been described herein. Nevertheless, it will be understood that various modifications may be made without departing from the spirit and understanding of this disclosure. Accordingly, other embodiments and approaches are within the scope of the following claims.

What is claimed is:

1. A plant for separating and dewatering wastewater, the plant comprising:
   an enclosure;
   an inclined rotating conveyor belt of filter material disposed within said enclosure, lower and upper portions of said conveyor belt encircling a lower pulley and an upper pulley;
   a wastewater inlet in a wall of said enclosure for delivering the wastewater onto the upper portion of the conveyor belt, wherein a filtered water from the wastewater flows through the conveyor belt leaving a cake on and in the conveyor belt;
   a spray nozzle mounted between the upper and the lower portions of the conveyor belt, the nozzle positioned for directing wash water at the lower portion of the conveyor belt for washing the cake off the lower portion of the conveyor belt;

an auger screw positioned below the conveyor belt in a position for receiving the cake and the wash water from the conveyor belt;

a pair of drains positioned at opposing ends of the auger screw; and a pair of dam plates positioned adjacent to the lower pulley, one of said dam plates being substantially horizontally mounted to said enclosure for directing the wastewater onto the upper portion of the conveyor belt, and the other of said dam plates extending longitudinally between said lower and upper portions of said conveyor belt for directing the filtered water into an alley for exiting the plant.

2. The plant of claim 1 further comprising a wire cage positioned at one end of the auger screw, the cage in fluid communication with bristles on the auger screw in positions for maintaining spaces between wires of the wire cage thereby assuring liquid flow therethrough.

3. The plant of claim 2 further comprising a spring loaded door adjacent the wire cage for directing the cake out of the plant.

4. The plant of claim 1 further comprising a belt scraper in contact with the lower portion of the conveyor belt in a position for removing the cake therefrom and for directing said cake into the auger screw and for preventing overspray from the wash water.

5. The plant of claim 1 further comprising a diverter panel and a catch shelf positioned within the plant, adjacent the wastewater inlet, enabling a reduction of wastewater kinetic energy.

* * * * *